Patented Aug. 11, 1953

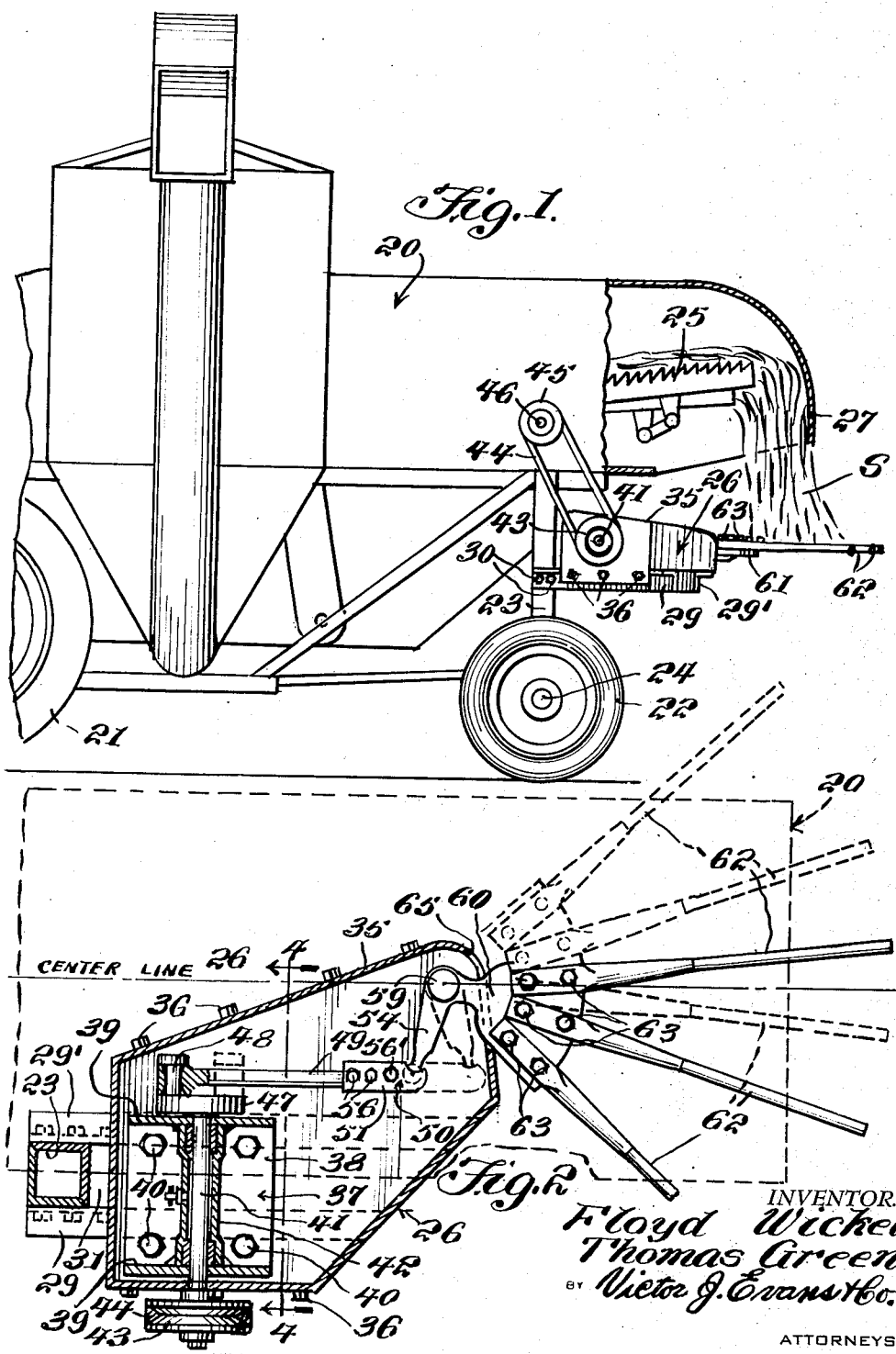

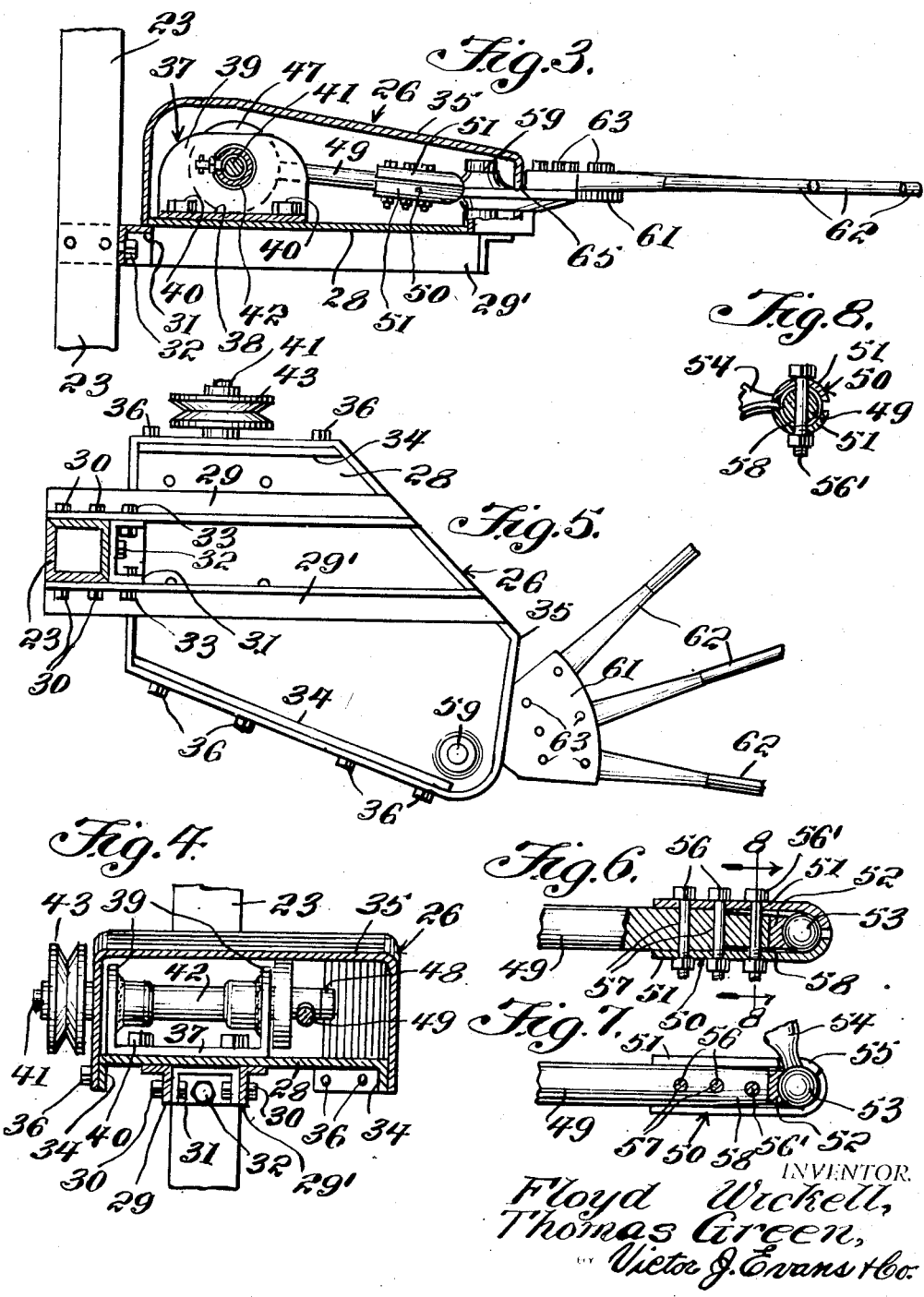

2,648,542

UNITED STATES PATENT OFFICE 2,648,542

STRAW SPREADER FOR COMBINES

Floyd Wickell and Thomas Green,
Mount Sterling, Ohio

Application February 13, 1951, Serial No. 210,641

2 Claims. (Cl. 275—3)

This invention relates to agricultural equipment, and more particularly to a straw spreader for a combine or harvester.

The object of the invention is to provide a mechanism for attachment to a conventional harvesting and threshing machine whereby the straw discharged by the machine will be scattered effectively and evenly over a wide area.

Another object of the invention is to provide a mechanism for scattering straw over a wide area that issues from a threshing machine as the machine moves along the field where the grain is being harvested.

A further object of the invention is to provide a straw spreader which is extremely simple and cheap to manufacture.

Other objects and advantages of the invention will be apparent during the course of the following description.

In the accompanying drawings forming a part of this application, and in which like numerals are used to designate like parts throughout the same:

Figure 1 is a fragmentary rear elevational view of a harvesting machine, with the straw-spreading mechanism of the present invention attached thereto;

Figure 2 is a horizontal sectional view taken through the spreading mechanism of the present invention;

Figure 3 is a vertical longitudinal sectional taken through the spreader mechanism of the present invention;

Figure 4 is a sectional view taken on the line 4—4 of Figure 2;

Figure 5 is a bottom plan view of the spreader mechanism;

Figure 6 is a fragmentary elevational view, with parts broken away and in section, of the cam arm;

Figure 7 is a view taken at right angles to the view shown in Figure 6;

Figure 8 is a sectional view taken on the line 8—8 of Figure 6.

Referring in detail to the drawings, the numeral 20 designates a conventional combine or harvesting machine which is mounted on wheels 21 and 22. The harvesting machine 20 has an upstanding beam 23 which extends upwardly from the axle 24, and arranged within the machine is a feeding mechanism 25. The feeding mechanism 25 is adapted to receive straw that has been cut or harvested and the present invention is directed to a straw-spreading mechanism which is indicated by the numeral 26, Figure 1. The straw-spreading mechanism of the present invention is adapted to receive the straw that is discharged or issues from the feeding mechanism 25. The straw is indicated by the letter S in Figure 1, and the straw S issues from the feeding mechanism 25, then passes through the discharge chute 27, whereby the spreading mechanism 26 of the present invention causes this straw to be spread over a wide area as the machine moves along the field of grain being harvested.

The straw-spreading mechanism 26 of the present invention includes a horizontally disposed base or platform 28, Figure 4, and the platform 28 is supported on horizontally disposed, spaced, parallel angle irons 29 and 29', Figure 5. The angle irons 29 and 29' are secured to the beam 23 by suitable securing elements, such as bolt-and-nut assemblies 30. A U-shaped brace 31 is also secured to the beam 23, the brace 31 being arranged between the angle irons 29 and 29'. Bolt-and-nut assemblies 33 serve to connect the angle irons 29 and 29' to the brace 31.

Arranged over the platform 28 is a cover 35. The cover 35 has its lower end overhanging or overlying the flanges 34, and the cover 35 is detachably connected to the flanges 34 by suitable securing elements, such as bolt-and-nut assemblies 36.

Arranged below the cover 35 and supported on the base 28 is a U-shaped bracket 37, Figures 2, 3 and 4. The bracket 37 includes a horizontally disposed web 38 which is secured to the platform 28 by bolt-and-nut assemblies 40, and the bracket 37 further includes spaced, parallel, upstanding legs 39.

Extending between the pair of legs 39 and rotatably supported thereby is a horizontally disposed shaft 41. A sleeve 42 is circumposed on the shaft 41, and a pulley 43 is connected to the outer end of the shaft 41. A belt 44 is trained over the pulley 43, and the belt 44 is also trained over a pulley 45 which is mounted on a power take-off shaft 46. The power take-off shaft 46 may be operated in any suitable manner from within the harvesting machine 20.

Mounted on the other end of the shaft 41 is a cam 47, and a pin 48 serves to pivotally connect one end of an arm 49 to the cam 47. Arranged on the front end of the reciprocating arm 49 is a casing 50, the casing 50 including a pair of co-acting sections 51 which embrace opposite ends of the arm 49. A bearing 52 is arranged within the casing 50 adjacent the end of the arm 49, and a ball 53 rotatably engages the bearing 52. A link 54 is secured to the ball 53, the link 54 riding or slidably moving through a slot 55 in the casing 50. Thus, there is provided a universal or ball-and-socket joint between the link 54 and the arm 49.

The pair of sections 51 of the casing 50 are maintained connected together and assembled on the arm 49 by means of bolt-and-nut assemblies 56, Figure 6. These bolt-and-nut assemblies 56 extend through bores 57 in the arm 49. Also, it will be seen from Figures 6 and 8 of the drawings that the end of the arm 49 within the casing 50 is cut away, as at 58. Further, it will be seen from Figure 8 of the drawings that there is a slight space between the meeting edges of the sections 51 of the casing 50, so that by tightening the bolt-and-nut assemblies 56', the sections 51 can be tightened on the ball 53 and arm 49.

The other end of the link 54 is connected to a shank 60 by means of a pin or shaft 59. The shank 60 may be formed integrally with or secured to a horizontally disposed, movable plate 61. The shank 60 is movable in a slot 65 which is formed in the cover 35, and a plurality of spaced fingers 62 are secured to the plate 61 by suitable securing elements, such as bolt-and-nut assemblies 63. Thus, as the straw S is discharged from the feeding mechanism 25, this straw will fall on the fingers 62 which are being moved back and forth, whereby the straw will be strewn over a wide area as the machine operates.

In use, the straw S is discharged from the feeding mechanism 25, Figure 1, onto the fingers 62 of the straw-spreading mechanism 26. The belt 44 causes the pulley 43 to be rotated, whereby the shaft 41 is turned or driven, and this results in the cam 47 being rotated. This rotation of cam 47 causes the arm 49 to reciprocate or move back and forth, whereby the link 54 will be actuated to thereby pivot the shank 60 and plate 61. Thus, the plate 61 will be rocked back and forth about a vertical axis whereby the fingers 62 will be swung in a horizontal plane to thereby spread or scatter the straw over a wide area.

The mechanism of the present invention can be attached to a combine or harvesting machine, and by means of the mechanism of the present invention, the straw will be spread out over a wide area in the field.

We claim:

1. In a straw-spreading mechanism for attachment to a combine, the combination with a vertically disposed beam, horizontally disposed angle irons projecting rearwardly from said beam and secured thereto, a horizontally disposed platform supported on said angle irons and secured thereto, flanges depending from said platform, a cover mounted over said platform and connected to said flanges, a U-shaped bracket including a web secured to said platform, and a pair of spaced parallel legs projecting upwardly from said web, a shaft rotatably supported by said legs, a pulley mounted on one end of said shaft and adapted to be connected to a source of power, a cam mounted on the other end of said shaft, an arm having one end pivotally connected to said cam, a casing connected to the other end of said arm, a link pivotally connected to said casing, there being a slot in said cover, a plate slidably arranged in said slot and having a shank connected to said link, and a plurality of spaced fingers extending rearwardly from said plate and connected thereto.

2. In a straw-spreading mechanism for attachment to a combine, the combination with a vertically disposed beam, horizontally disposed angle irons projecting rearwardly from said beam and secured thereto, a horizontally disposed platform supported on said angle iron and secured thereto, flanges depending from said platform, a cover mounted over said platform and connected to said flanges, a U-shaped bracket including a web secured to said platform, and a pair of spaced parallel legs projecting upwardly from said web, a shaft rotatably supported by said legs, a pulley mounted on one end of said shaft and adapted to be connected to a source of power, a cam mounted on the other end of said shaft, an arm having one end pivotally connected to said cam, a casing connected to the other end of said arm, a link pivotally connected to said casing, there being a slot in said cover, a plate slidably arranged in said slot and having a shank connected to said link, a plurality of spaced fingers extending rearwardly from said plate and connected thereto, and means for adjusting the tension of said casing on said arm.

FLOYD WICKELL.
THOMAS GREEN.

References Cited in the file of this patent

UNITED STATES PATENTS

| Number | Name | Date |
|--------|------|------|
| 343,789 | Baker | June 15, 1886 |
| 411,692 | Strawson | Sept. 24, 1889 |
| 1,716,085 | Perkins | June 4, 1929 |
| 1,769,302 | MacGregor | July 1, 1930 |
| 1,895,665 | Johnson | Jan. 31, 1933 |
| 2,085,171 | Sheard | June 29, 1937 |
| 2,554,669 | Elofson | May 29, 1951 |